US008296232B2

(12) United States Patent
Tullis et al.

(10) Patent No.: US 8,296,232 B2
(45) Date of Patent: *Oct. 23, 2012

(54) SYSTEMS AND METHODS FOR SCREENING PAYMENT TRANSACTIONS

(75) Inventors: John Tullis, San Francisco, CA (US); Mark Norris, San Francisco, CA (US); Vishwanath Shastry, Mountain View, CA (US); Kate J. Kennedy, Roseville, CA (US); Justin Mason Chace, Redwood City, CA (US); Susan J. French, Foster City, CA (US)

(73) Assignee: Visa International Service Association, San Francisco, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/051,996

(22) Filed: Mar. 18, 2011

(65) Prior Publication Data

US 2011/0270756 A1 Nov. 3, 2011

Related U.S. Application Data

(60) Provisional application No. 61/330,283, filed on Apr. 30, 2010.

(51) Int. Cl.
*G06Q 40/00* (2012.01)

(52) U.S. Cl. ............... 705/39; 705/35; 705/38; 705/44; 705/75; 705/77

(58) Field of Classification Search .................... 705/35, 705/38, 39, 75, 77
See application file for complete search history.

(56) References Cited

U.S. PATENT DOCUMENTS

| 5,317,636 | A | * | 5/1994 | Vizcaino ................... 705/65 |
| 7,258,274 | B2 | | 8/2007 | Levinas et al. |
| 7,636,679 | B2 | | 12/2009 | Song et al. |
| 7,809,650 | B2 | * | 10/2010 | Bruesewitz et al. ............ 705/64 |
| 2002/0138407 | A1 | * | 9/2002 | Lawrence et al. ................ 705/38 |
| 2003/0033228 | A1 | | 2/2003 | Bosworth-Davies et al. |
| 2003/0233319 | A1 | * | 12/2003 | Lawrence ....................... 705/39 |
| 2005/0267827 | A1 | | 12/2005 | Grant et al. |
| 2007/0168281 | A1 | | 7/2007 | Bishop et al. |
| 2007/0288355 | A1 | | 12/2007 | Roland et al. |
| 2008/0249937 | A1 | | 10/2008 | Walls et al. |
| 2009/0089107 | A1 | * | 4/2009 | Angell et al. ..................... 705/7 |
| 2009/0222369 | A1 | * | 9/2009 | Zoldi et al. ..................... 705/35 |
| 2010/0057622 | A1 | * | 3/2010 | Faith et al. ..................... 705/71 |

OTHER PUBLICATIONS

Notice of Allowance and Interview Summary of Jan. 9, 2012 for U.S. Appl. No. 13/051,993, 10 pages.
Non-Final Office Action of Nov. 21, 2011 for U.S. Appl. No. 13/051,993, 35 pages. Cocheo, S., "26 Ways to Get the Best out of BSA Technology", American Bankers Association, ABA Banking Journal, Oct. 2009, vol. 101, No. 10, 4 pages.
Paletta, D., "Why Banks Struggle in Remittance: A Fed View", American Banker, Aug. 11, 2005, vol. 170, Issue 154, 3 pages.
Young, C., "Analysis, Periodic Account Activity and Automated Money Laundering Detection", Journal of Money Laundering Control, Spring 2004, vol. 7, No. 4, pp. 295-297.

* cited by examiner

*Primary Examiner* — Elizabeth Rosen
(74) *Attorney, Agent, or Firm* — Kilpatrick Townsend & Stockton LLP (57) ABSTRACT

Methods and systems for anti money laundering screening are provided. A risk score and a first validation code is determined based on information related to a funds transfer transaction. The first validation code is associated with the risk score. Thereafter, a second validation code is calculated and compared with the first validation code. The risk score and the validation score are included in a payment authorization message sent to a payment processing network. The payment processing network extracts the validation code and communicates the payment authorization message including the risk score to a receiving financial institution. The receiving financial entity accepts or denies the incoming funds transfer based on the risk score included in the payment authorization message.

17 Claims, 9 Drawing Sheets

| 402 | 404 | 406 | 408 | 410 | 412 |
|---|---|---|---|---|---|
| Receiving entity PAN | Processing Code | Merchant Category | Financial Institution ID | Transaction ID | Sender Details |

FIG. 4

| 502 | 504 | 506 | 508 |
|---|---|---|---|
| Transaction ID | Risk Score | Validation Code | Activity Check Results |

FIG. 5

| 602 | 604 | 606 | 608 | 610 | 612 | 614 |
|---|---|---|---|---|---|---|
| Sender PAN | Risk Score | Validation Code | Receiving entity PAN | Transaction ID | Transaction Details | Sender Details |

SYSTEMS AND METHODS FOR SCREENING PAYMENT TRANSACTIONS

CROSS-REFERENCES TO RELATED APPLICATIONS

The present application claims benefit under 35 U.S.C. §119(e) of U.S. Provisional Patent Application No. 61/330,283, entitled "Methods And Systems For Screening Payment Transactions", filed Apr. 30, 2010, the contents of which are hereby incorporated by reference in its entirety for all purposes.

The present application is related to commonly owned and co-pending U.S. patent application Ser. No. 13/051,993 filed on Mar. 18, 2011.

BACKGROUND

Over the past decade there has been an exponential increase in money transfer transactions. In addition to financial institutions, individuals can now transfer money using both the traditional route, e.g., wire transfer through a financial institution, and using their payment cards, e.g., Visa Money Transfer.

With the advent of globalization, people are increasingly travelling to different regions and countries for employment. In addition, the increased use of the Internet has enabled people to communicate with each other regardless of their location. A combined effect of globalization and improved means of communication has resulted in an increase in number of money transfer operations among financial institutions, business entities, and individuals. Services such as, Visa Money Transfer have made it easy for individuals to transfer money from their bank accounts and/or payment card accounts to other entities.

Cross-border money transfer transactions are on the rise. A cross-border money transfer is a transaction where money is sent by an entity from country A to an entity in country B. Often it is difficult to ascertain the motive behind the money transfer. With rise of global terrorism, many governments now mandate that such cross-border transactions be monitored for potential money laundering activities other unlawful activities.

Currently, sending financial institutions perform some screening for such transactions prior to the transfer. However, often the receiving financial institution has no way to determine if the incoming transaction is legitimate. This problem is especially acute in countries where the banking infrastructure is poor and the screening methods are not reliable or can be easily circumvented. Recently, many governments throughout the world have mandated that financial institutions monitor funds transfer activities for potential unlawful activities such as money laundering.

What is needed is a robust and tamper-proof screening service for money transfer transactions that will provide reliable information to both the sending and the receiving financial institutions in order to judge the legitimacy of a particular money transfer transaction.

SUMMARY

Embodiments of the present invention provide a method for screening a money transfer transaction. The method comprises receiving information about a set of attributes associated with a sending entity from a sending financial institution. The method further comprises receiving information about a set of attributes associated with a receiving entity and searching a database to determine whether one or more attributes from the set of attributes associated with the sending entity and/or the receiving entity correspond to information in the database. The method further includes determining a risk score for the money transfer transaction based on the searching, determining a first validation code and associating the first validation code with the risk score. The method further includes communicating the risk score and the first validation code to the sending financial institution.

Thereafter, the method includes receiving a payment authorization message associated with the money transfer transaction from the sending financial institution wherein the payment authorization message includes the risk score and the first validation code. Upon receipt of the payment authorization message, the method further comprises calculating a second validation code based at least in part on the information in the payment authorization message, determining that the second validation code is the same as the first validation code, extracting the first validation code from the payment authorization message, and communicating the payment authorization message to a receiving financial institution.

In some embodiments, the set of attributes of the receiving entity comprise name, address, identification number, and country of residence. One skilled in the art will realize that many more attributes in addition to or in lieu of the ones described above may be used.

In some embodiments, the database includes information received from one or more of Office of Foreign Assets Control (OFAC), US department of Commerce, the White House, US regulatory actions, and information provided by government and non-government entities outside the United States.

In some embodiments, each attribute from the set of attributes is weighted differently from each other and the method further comprises determining an individual risk score for each of the attributes from the set of attributes and determining a combined risk score based on the weight assigned to each attribute and the individual risk score of each attribute.

In some embodiments, the validation code is determined by applying a validation algorithm to a predetermined/fixed set of attributes. In some embodiments, the fixed set of attributes comprises name of the sending entity, country code of the sending entity, the risk score, account number of the receiving entity, and a transaction ID associated with the money transfer.

Certain embodiments of the present invention provide a computer server that can perform the method of a money transfer transaction discussed above.

Some embodiments of the present invention provide a method for funds transfer performed by a receiving financial institution. The method comprises receiving a payment authorization message indicating an incoming funds transfer from sending financial institution where the message includes a risk score associated with the funds transfer, and determining whether to accept or deny the incoming funds transfer based at least in part on the risk score. In the method, determining whether to accept or deny the incoming funds transfer comprises comparing the risk score with a threshold value, determining whether the risk score is above or below the threshold value, allowing the transaction if the risk score is lower than the threshold value, and denying the transaction if the risk score is higher than the threshold value.

The following detailed description, together with the accompanying drawings will provide a better understanding of the nature and advantages of the present invention.

DETAILED DESCRIPTION

Embodiments of the present invention provide methods for performing a funds transfer operation that includes anti-money laundering screening. In an embodiment, the sending financial institution gathers information about the funds sending entity and the funds receiving entity. This information is provided to an anti-money laundering screening system for verification that the entities involved in the funds transfer are not involved in money laundering activities. The anti-money laundering screening system compares the information received from the sending financial institution with information in its database and generates a risk score for that transaction. In some embodiments, the risk score indicates a percentage match between the information received from the sending financial institution and the information in its database. A payment processing network generates a unique validation code and associates the unique validation code with the risk score. The risk score and the validation code are sent back to the sending financial institution. The sending financial institution includes the risk score and the unique validation code in a payment authorization message sent to the receiving financial institution via the payment processing network.

The payment processing network receives the payment authorization message and recalculates the validation code based on information in the payment authorization message. If the validation code included in the payment authorization message and the one calculated by the payment processing network match, the risk score is deemed authentic. The unique validation code is extracted from the payment authorization message and the payment authorization message is forwarded to the receiving financial institution. The receiving financial institution determines, based on the risk score, on whether to accept or deny the incoming funds transfer.

Figure 1:
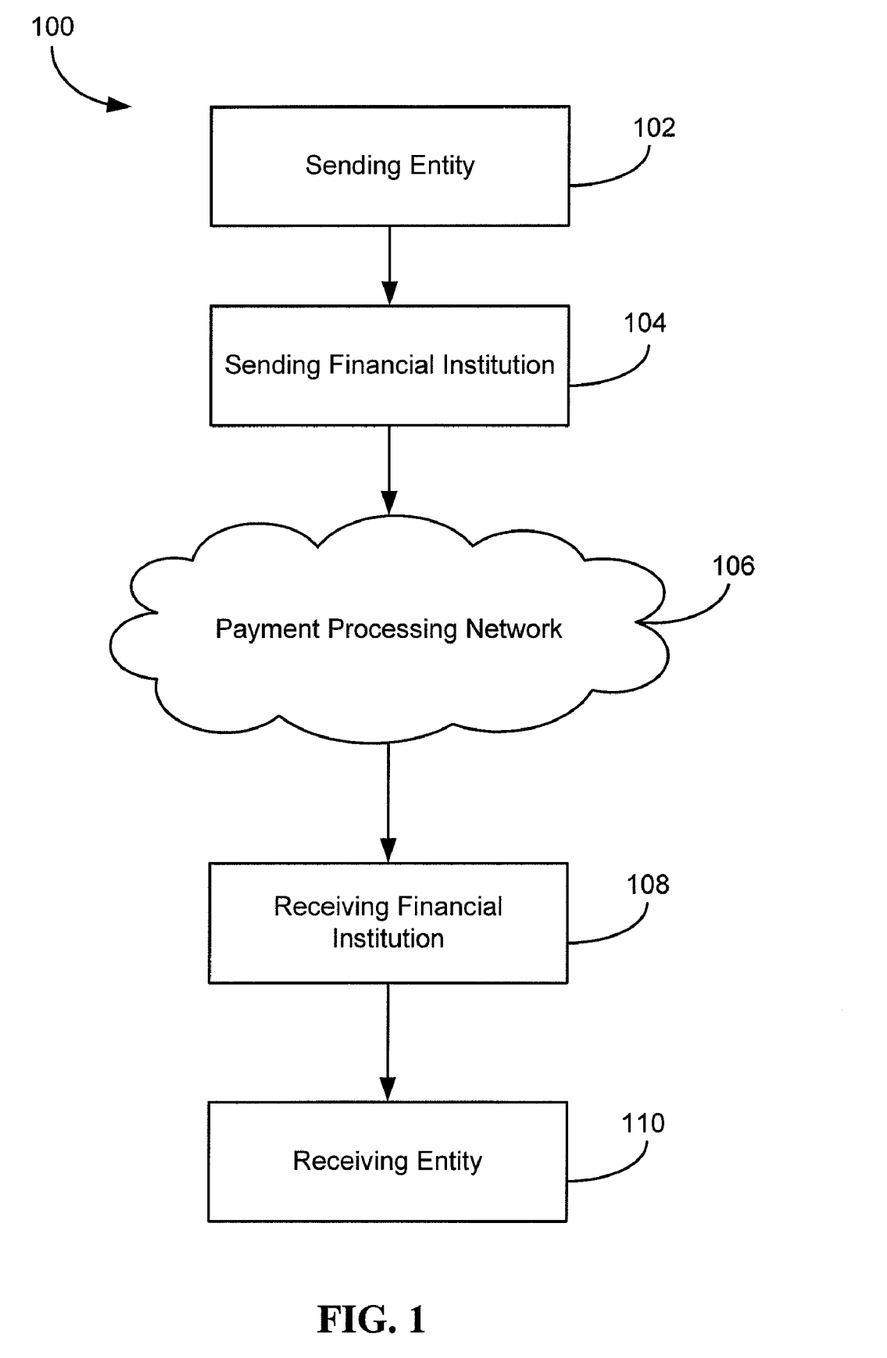
FIG. 1 illustrates a conventional money transfer process.

FIG. 1 is a block diagram of a system 100 for performing funds transfer transaction using a payment processing network 106. System 100 includes a sending entity 102, a sending financial institution 104, a receiving financial institution 108, and a receiving entity 110. Sending entity 102 may be an individual, or an organization such as a business that intends to transfer money.

Sending entity 102 may transfer funds from its bank account, using cash, or using a payment device. The payment device may be in any suitable form. For example, suitable payment devices may be hand-held and compact so that they can fit into a consumer's wallet and/or pocket (e.g., pocket-sized). They may include smart cards, ordinary credit or debit cards (with a magnetic strip and without a microprocessor), keychain devices (such as the Speedpass™ commercially available from Exxon-Mobil Corp.), etc. Other examples of payment devices include cellular phones, personal digital assistants (PDAs), pagers, payment cards, security cards, access cards, smart media, transponders, and the like. The payment devices can also be debit devices (e.g., a debit card), credit devices (e.g., a credit card), or stored value devices (e.g., a stored value card).

Sending financial institution 104 may be a bank or a money transfer facility, e.g., Western Union. In some embodiments, sending entity 102 may have an account with sending financial institution 104. In other embodiments, sending entity 102 may not have any preexisting relationship with sending financial institution 104.

The payment processing network 106 may include data processing subsystems, networks, and operations used to support and deliver authorization services, exception file services, and clearing and settlement services. An exemplary payment processing network may include VisaNet™. Payment processing networks such as VisaNet™ are able to process credit card transactions, debit card transactions, and other types of commercial transactions. VisaNet™, in particular, includes a VIP system (Visa Integrated Payments system) which processes authorization requests and a Base II system which performs clearing and settlement services.

Payment processing network 106 may include a server computer. A server computer is typically a powerful computer or cluster of computers. For example, the server computer can be a large mainframe, a minicomputer cluster, or a group of servers functioning as a unit. In one example, the server computer may be a database server coupled to a Web server. Payment processing network 106 may use any suitable wired or wireless network, including the Internet.

Receiving financial institution 108 may be a bank, a money acceptance facility, or any other entity authorized to process funds transfer transactions. Receiving entity 110 may be an individual, or an organization such as a business that is the beneficiary of the funds transfer operation. In some embodiments, receiving entity 110 may have a preexisting relationship with receiving financial institution 108. In other embodiments, receiving entity 110 may not have a preexisting relationship with receiving financial institution 108.

In a typical funds transfer operation, sending entity 102 communicates with sending financial institution 104 to initiate a funds transfer operation. Sending entity 102 provides the name and contact information of receiving entity 110 to sending financial institution 104. Once the funds to be transferred are provided by sending entity 102, sending financial institution 104 generates a payment authorization message and sends the payment authorization message to payment processing network 106.

Payment processing network 106 forwards the payment authorization message to receiving financial institution 108. Receiving financial institution 108 authorizes the incoming funds transfer and credits the funds to receiving entity 110. At the end of the day, a normal clearing and settlement process can be conducted by the system 100. A clearing process is a process of exchanging financial details between sending financial institution 104 and receiving financial institution 108 to facilitate crediting of funds to the receiving entity's 110 account. Clearing and settlement can occur simultaneously.

In the funds transfer operation described above, neither sending financial institution 104 nor receiving financial institution 108 perform any type of screening for potential money laundering. Sending financial institution 104 receives the funds from sending entity 102 and sends the funds over to receiving financial institution 108 for delivery to receiving entity 110. In some instances, sending financial institution 104 may provide some screening capability based on sending entity's account number and other financial details, however, there is no screening provided to determine whether the sending entity and/or the receiving entity are involved in unlawful activities such as, money laundering. Embodiments of the present invention provide a managed service that can screen funds transfer operations for potential money laundering activities.

Figure 2:
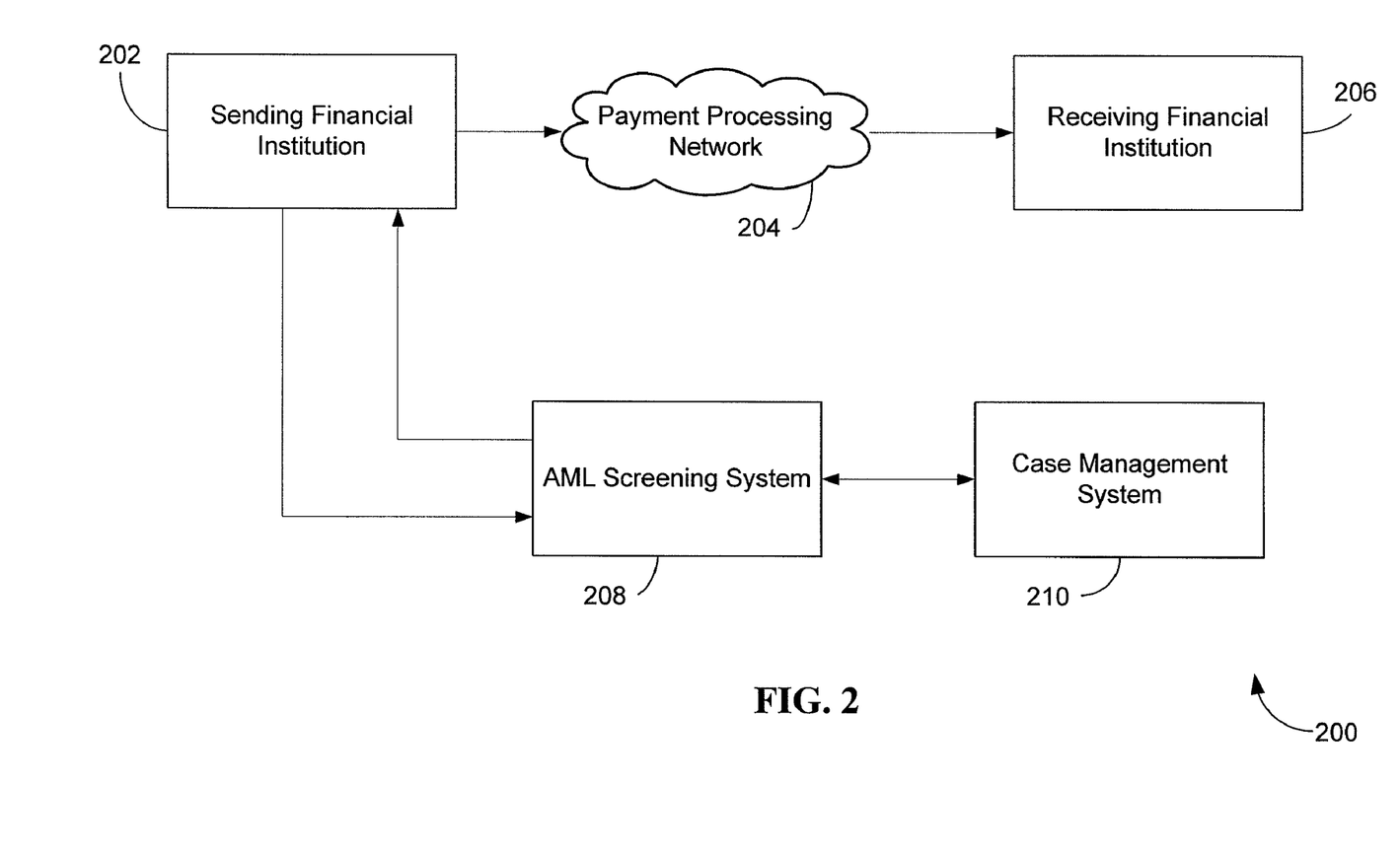
FIG. 2 is a block diagram of a anti-money laundering screening system according to an embodiment of the present invention.

FIG. 2 is a block diagram of a system 200 for screening funds transfer transactions according to an embodiment of the present invention. System 200 comprises a sending financial institution 202, a payment processing network 204, a receiving financial institution 206, an anti-money laundering screening system 208, and a case management system 210. In this embodiment, the anti-money laundering screening is provided for the benefit of the sending financial institution.

Sending financial institution 202 may be a bank, a money transfer provider, e.g., western union, or an entity authorized to transfer funds. Sending financial institution 202 may operate a server computer than can accept input associated with a funds transfer operation and communicate with anti-money laundering screening system 208 and payment processing network 204. Receiving financial institution 206 may be a similar to sending financial institution 202 and may also have a server computer configured to communicate with payment processing network 204 and sending financial institution 202.

Anti-money laundering screening system 208 may comprise one or more server computers configured to screen information received from sending financial institution 202 and communicate the results of the screening to sending financial institution 202. Details of the server computer that may be used to implement anti-money laundering screening system 208 are provided below in relation to FIG. 10.

Case management system 210 may comprise logic to determine one or more actions to be performed based on the screening results provided by anti-money laundering screening system 208. In some embodiments, case management system 210 may communicate the determined one or more actions to sending financial institution 202. Although case management system 210 and anti-money laundering screening system 208 are illustrated as separate blocks in FIG. 2, they can be integrated into the sending financial institution's infrastructure. Case management system 210 may be implemented using one or more computer system described below in FIG. 10.

In an embodiment, a sending entity provides information about itself and a receiving entity to sending financial institution 202. The information provided by the sending entity may include various attributes associated with the sending entity and/or the receiving entity. For example, some of the attributes associated with the sending entity may be name of the sending entity, address of the sending entity, identification number of the sending entity, e.g., social security number or FEIN number, account information, etc. These attributes may be requested by sending financial institution 202 as part of the money transfer operation. Similarly, the sending entity may be asked to provide information about the receiving entity that includes one or more of the attributes discussed above. In some embodiments, the requested attributes fro the sending entity may be different from the requested attributes of the receiving entity.

In some embodiments, anti-money laundering screening system 208 stores information about entities (individuals and corporations) designated as being involved in money laundering and other illegal activities in an anti-money laundering database. Anti-money laundering screening system 208 may receive this information from various sources, such as, for example: a list generated by the Office of Foreign Assets Control (OFAC) including their sanction and embargo list, a list generated by the U.S. Commerce Department, a list of international "kingpins" generated by the U.S. White House, foreign Counterpart list, U.S. regulatory actions or other information source such as a foreign government, U.S. adverse business-related media reports, U.S. state regulatory enforcement actions, international regulatory enforcement actions, international adverse business-related media reports, a list of politically connected individuals and military leaders, list of U.S. and international organized crime members and affiliates, a list put forth by the Financial Action Task Force (FATF), a list of recognized high risk countries, or other source of high risk variables. Court records or other references relating to fraud, bankruptcy, professional reprimand or a rescission of a right to practice, suspension from professional ranks, disbarment, prison records or other source of suspect behavior can also be an important source of information. In addition anti-money laundering screening system 208 may also receive information indicative that an entity is not high risk such as a list of corporations domiciled in a G-7 country, or a list of entities traded on a major exchange.

In an embodiment, once anti-money laundering screening system 208 receives the attribute information from sending financial institution 202, it compares the various attributes against the information in the anti-money laundering database to determine a level of match between an attribute and information in the database. Based on the comparison results, anti-money laundering screening system 208 generates a risk score for the transaction. In some embodiments, the risk score may be a percentage value between 0% and 100%, where a risk score of 0% indicates no match and hence a low probability that the entities are involved in an illegal activity and a risk score of 100% indicates high probability that the entities are involved in an illegal activity. In practice however, the sending financial institution may define a threshold value or ranges for the risk score in order to determine actions to be taken for the screened funds transfer transactions. For example, in one embodiment, the sending financial institution may allow any funds transfer transaction with a risk score of 75% or less, while a funds transfer transaction with a risk score of above 75% would result in the transaction being denied or placed on hold. In other embodiments, the sending financial institution may define ranges for the risk score. For example, a risk score between 0% and 75% may indicate a low probability that the entities are involved in an illegal activity, a risk score between 75% and 95% may indicate a medium probability that the entities are involved in an illegal activity and result in a temporary hold on the transaction with a risk score within that range, and a risk score of 95% and above may indicate a high probability that the entities are involved in an illegal activity and may result in the transaction being denied.

Once sending financial institution makes a decision on whether to allow or deny the transaction, it can send a payment authorization message to the receiving financial institution. The embodiment described in FIG. 2 allows the sending financial institution to screen the money transfer transaction before communicating to the receiving financial institution. In some embodiments, the sending financial institution can specify criteria for screening of transactions that the anti-money laundering screening system can use to screen the transactions. For example, the sending financial institution may specify that only transfers in excess of $1000 be screened thereby reducing the amount of screening overhead, especially considering the number of such transactions that the sending financial institution may perform on a daily basis. In addition, the sending financial institution may provide to the anti-money laundering screening system names and other information about specific entities that it wants screened. These names may be in addition to the information in the anti-money laundering database.

Figure 3:
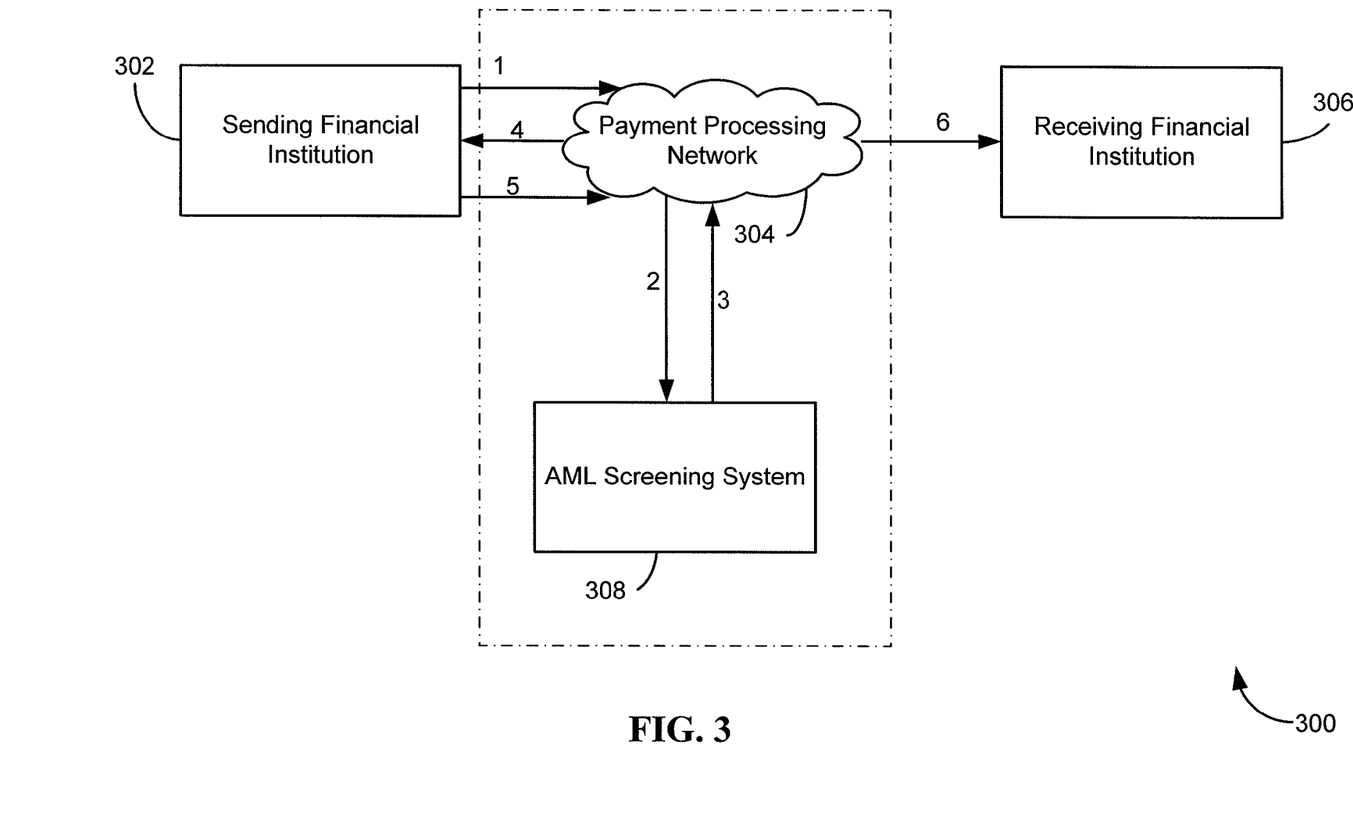
FIG. 3 is a block diagram of a anti-money laundering screening system according to another embodiment of the present invention.

FIG. 3 is a block diagram of a system 300 for screening funds transfer transactions according to another embodiment of the present invention. System 300 provides information about the screening results to the receiving financial institution, which can then make a decision whether to accept or deny the incoming transaction. System 300 comprises a sending financial institution 302, a payment processing network 304, a receiving financial institution 306, and an anti-money laundering screening system 308. The various components of system 300 have similar structure as the corresponding components of system 200 described above.

In operation, sending financial institution 302 receives information about the sending entity, the receiving entity, and other details associated with a funds transfer request. As described above, the information about the sending entity and the receiving entity may include one or more attributes associated with them such as, name, address, identification number, country code, etc. The other details associated with the funds transfer operation may include amount of transfer, transaction ID, bank routing information, etc. Sending financial institution 302 sends a request for anti-money laundering screening to anti-money laundering screening system 308 (1) via payment processing network server computer 304. The request may include one or more attributes associated with the sending entity and/or the receiving entity, e.g., name, origin country, destination country, etc. Details of the anti-money laundering screening request message are described in relation to FIG. 4 below. Anti-money laundering screening system 308 receives the request (2) and searches its anti-money laundering database to determine if any of the attributes received from sending financial institution 302 match any data in the anti-money laundering database. As described above in connection with FIG. 2, the database may include information received from various sources.

In an embodiment, anti-money laundering screening system 308 may use any of the commercially available algorithms for performing the matching/comparison process, e.g., Norkom, Once anti-money laundering screening system 308 completes the matching/comparison process, it generates a risk score for the transaction. As mentioned above, in an embodiment, the risk score can be a number between 0% and 100%, where a lower percentage indicates a low probability that the funds transfer operation is associated with money laundering activity while a higher percentage indicates a high probability that the funds transfer operation is associated with money laundering activity. Anti-money laundering screening system 308 sends a anti-money laundering screening response message to sending financial institution 302 (3) via payment processing network server computer 304. Payment processing system server computer 304 determines a first validation score based on information received from sending financial institution 302 and associates the first validation code with the risk score received from anti-money laundering screening system 308. Payment processing network server computer 304 then includes the first validation code in the anti-money laundering screening response message and communicates it to sending financial institution 302 (4). In an embodiment, the first validation code is calculated using certain inputs and applying a predefined algorithm to the inputs. For example, the first validation code may be calculated by applying the pre-defined algorithm to an input including name of the sending entity, sending entity country code, the risk score, receiving entity's account number, and a transaction ID associated with the money transfer operation. Details of the anti-money laundering screening response message are provided below in relation to FIG. 5.

Sending financial institution 302 receives the anti-money laundering screening results from anti-money laundering screening system 308 via payment processing network 304 (4) and generates a payment authorization message. The payment authorization message includes the risk score and the first validation code, among other information. Details of the payment authorization message are described below in relation to FIG. 6. Sending financial institution 302 communicates the payment authorization message to payment processing network 304 (5). Payment processing network 304 generates a second validation code using the same inputs and the same algorithm used to generate the first validation code. Once payment processing network generates the second validation code, it compares the second validation code with the first validation code in the payment authorization message. If the second validation code matches the first validation code in the payment authorization message, payment processing network 304 determines that the payment authorization message is genuine.

If the two validation codes do not match, payment processing network 304 sends an error message to sending financial institution 302. In some embodiments, the error message may specify the reason for failure. In other embodiments, the error message may not provide any details about the reason for the failure. In some embodiments, anti-money laundering screening system 308 and the payment processing network 304 may be integrated into a single service and operated by a single entity, e.g., a payment processing entity such as VISA or MASTERCARD. In other embodiments, the anti-money laundering screening system 308 and the payment processing network 304 may be distinct and operated by different entities.

In the event that the second validation code matches the first validation code in the payment authorization message, payment processing network 304 extracts the first validation code from the payment authorization message and sends the payment authorization message to receiving financial institution 306 (6). Receiving financial institution 306 may analyze the risk score to determine whether to accept or deny the incoming funds transfer.

In some embodiments, the risk score is a percentage value between 0% and 100% or an integer between 0 and 100. A low risk score indicates a low probability that the parties involved in the funds transfer operation are associated with money laundering activities while a high risk score may indicate a high probability that the parties involved in the funds transfer operation are not associated with money laundering activities. In some embodiments, the risk score is calculated using pre-defined attributes, e.g., sending entity name, sending entity address, sending entity country code, receiving entity name, receiving entity country code. In some embodiments, the calculated risk score is a single value that is a combination of screening results for all the individual inputted attributes. In some embodiments, the sending financial institution may request for individual risk scores for each of the attributes. For example, the sending financial institution may request a risk score for each of sending entity name, sending entity address, sending entity country code, receiving entity name, and receiving entity country code. In this instance, the sending financial entity may then analyze the individual risks scores to determine whether to allow or deny the transaction. A receiving financial institution may also request similar individual risks scores.

In some embodiments, each attribute used to calculate the risks score may be given different weighting. For example, name of the sending entity may be weighted more than the address of the sending entity. The weightings for the attributes may be specified by the sending financial institution, the receiving financial institution, and/or the payment processing network. In some embodiments, the anti-money laundering screening system can be configured to analyze risk score patterns over a period of time to determine the weighting to be given for each attribute. In this instance where each attribute has a different weighting, the calculated risk score is determined based on the percentage match of each attribute with information in the database and the weight assigned to that attribute. For example, consider that name of the sending entity has a weighted value of 2 on a scale of 0 to 10 and address of the sending entity has a weighted value of 8. When the anti-money laundering screening system performs the matching process, consider that there is a 90% match for the name while there is a 60% match for the address. Since the address has a higher weighted value than the name, even though the percentage match for the name is high, the overall risk score will be closer to 60% indicating a low probability of fraudulent activity. To further illustrate the point, consider that the name of the sending entity is "Osama bin Laden" and his address is "1234 Cedar Street, Anytown, USA 95043." In this instance, the name search will likely result in a 100% match with the information in the anti-money laundering database while the address search will result in a very low or no match with the information in the anti-money laundering database. In this instance, the overall risk score will likely be low since the name has a lower weighting than the address. It is entirely possible that there is another person named Osama bin Laden who is an average citizen with no ties to any unlawful activity. One of the advantages of using different weightings for each attribute is that it may significantly reduce the number of false positive results. In some embodiments, the weightings for each attribute can be periodically adjusted based on analysis of historical data.

Figure 4:
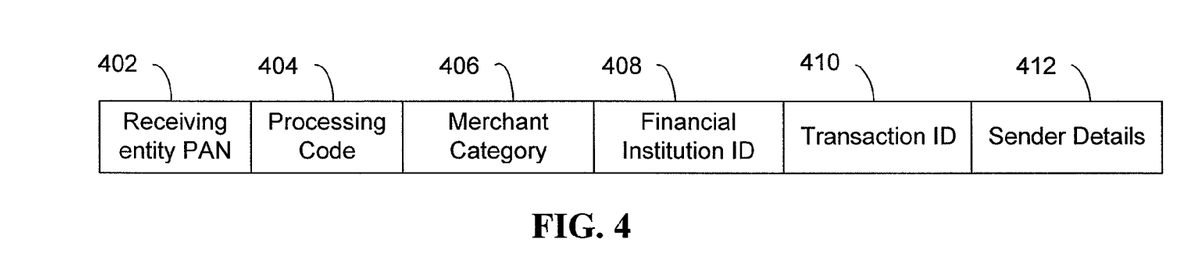
FIG. 4 illustrates structure of a screening request message according to an embodiment of the present invention.

As described above, the sending financial institution sends a anti-money laundering screening request message to the anti-money laundering screening system. The anti-money laundering screening system then uses the information in the anti-money laundering screening request message to search the anti-money laundering database. FIG. 4 illustrates an anti-money laundering screening request message 400 according to an embodiment of the present invention. Anti-money laundering screening request message 400 includes multiple fields. In some embodiments, anti-money laundering screening message is implemented using XML, although one skilled in the art will realize that any other suitable messaging protocol may also be used.

In an embodiment, anti-money laundering screening request message 400 may include a receiving entity personal account number (PAN) 402. Receiving entity PAN 402 may comprise the account number of the receiving entity into which the funds will be ultimately deposited by the receiving financial institution. In some embodiments, receiving entity PAN 402 can be a numerical value of up to 19 digits or more. Processing code field 404 may comprise information that indentifies the sending entity transaction type and sending entity account types. For example, the transaction type may be purchase of goods or services and the account type may be "debit." If the sending entity uses a credit card as the source of the funds to be transferred, processing code 404 may indicate the account type as "credit." In some embodiments, processing code 404 may be up to 3 bytes long or longer.

Merchant category 406 may include information about the type of service or goods being provided by the sending financial institution. For example, merchant category may indicate whether the service being provided is a money transfer or a money order. In some embodiments, merchant category 406 may indicate whether the sending financial institution is a bank (e.g., Bank of America) or a money transfer agency (e.g., Western Union). In some embodiments, merchant category 406 may be 2 bytes in length. Financial intuition ID 408 comprises information identifying the sending and/or the receiving financial institution. Financial institution ID 408 may include a routing number or any other information that uniquely identifies the sending financial institution and/or the receiving financial institution. Transaction identifier 410 may comprise a unique identifier that is associated with the funds transfer transaction. In some embodiments, transaction identifier 410 can be alphanumeric. Transaction identifier 410 is used to track the funds transfer operation and is included in every message that is exchanged among the sending financial institution, the anti-money laundering screening system, the payment processing network, and the receiving financial institution.

Sender details 412 may include information about the sending entity. In some embodiments, sender details 412 may include the name, address, country of residence, account number, etc. of the sending entity. Sender details 412 may be used by the anti-money laundering screening system to search the anti-money laundering database.

Even though anti-money laundering screening request message 400 is shown as including certain information, one skilled in the art will realize that other types of information in lieu of or in addition to the information illustrated in FIG. 4 may be included in anti-money laundering screening request message 400.

Figure 5:
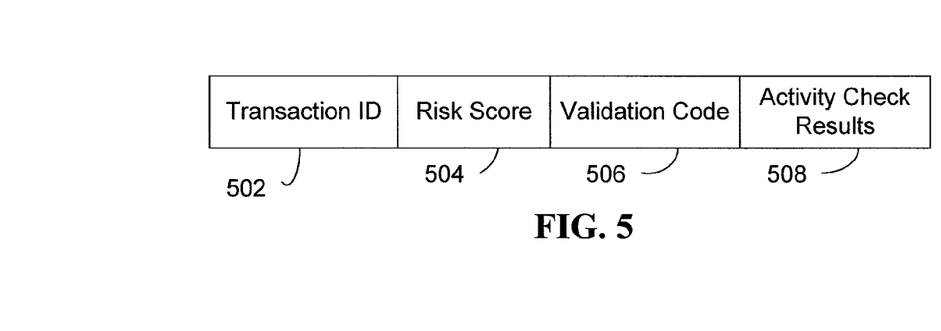
FIG. 5 illustrates structure of a screening response message according to an embodiment of the present invention.

Once the anti-money laundering screening system receives the anti-money laundering screening request message, the anti-money laundering screening system executes one or more search algorithms to identify similarities between the information received from the sending financial institution and the information present in the anti-money laundering database. Upon completion of the search, the anti-money laundering screening system generates a anti-money laundering screening response message and communicates that to the sending financial institution. FIG. 5 illustrates an anti-money laundering screening response message 500 according to an embodiment of the present invention.

In some embodiments, anti-money laundering screening response message 500 comprises a transaction ID 502, a risk score 504, a validation code 506, and activity check results 508. Transaction ID 502 is the same as the transaction identifier 410 described above in reference to FIG. 4. Anti-money laundering screening response message may also include a risk score 504. As described above, after the anti-money laundering screening system performs the search operation, it generates a risk score that indicates the extent to which the information provided by the sending financial institution matches the information in the anti-money laundering database.

In some embodiments, anti-money laundering screening response message may include a validation code 506. Validation code 506 is associated with risk score 504 and is a unique code generated by the anti-money laundering screening system. In some embodiments, validation code 506 is generated using specific information and a pre-defined algorithm. For example, in some embodiments, validation code 506 is generated using sending entity's name, sending entity's country code, the risk score, receiving entity PAN, and transaction ID 502. However, one skilled in the art will realize other items of information may be used to generate validation code 506. Validation code 506 is a unique identifier that is associated with a single risk score 504 and a single screening request message. In other words, each risk score 504 calculated by the anti-money laundering screening system has an associated unique validation code 506. Validation code 506 may not be shared among multiple risk scores.

Activity check results 508 comprises information indicating the results of checks performed by the anti-money laundering screening system. In some embodiments, activity check results 508 may include indication of whether the screening was successful or unsuccessful. In the event the screening is unsuccessful, activity check results 508 may include information indicating the reason for the unsuccessful screening, e.g., problems with the input data, anti-money laundering screening system unavailable, etc. Any such reporting information may be included in activity check results 508.

Even though anti-money laundering screening response message 500 is shown as including certain information, one skilled in the art will realize that other types of information in lieu of or in addition to the information illustrated in FIG. 5 may be included in anti-money laundering screening response message 500.

Figure 6:
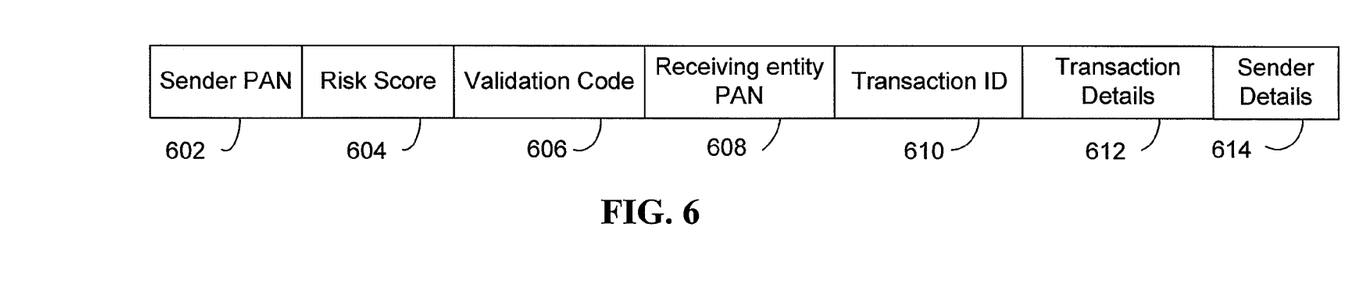
FIG. 6 illustrates structure of a payment authorization message according to an embodiment of the present invention.

The anti-money laundering screening system generates the anti-money laundering screening response message 500 and sends this message to the sending financial institution. Based on the risk score, the sending financial institution may decide to allow or deny the funds transfer transaction to proceed. In the instance that the funds transfer transaction is allowed to proceed, the sending financial institution generates a payment authorization message 600, as illustrated in FIG. 6, according to an embodiment of the present invention. Payment authorization message is sent by the sending financial institution, via the payment processing network, to the receiving institution.

Payment authorization message 600 includes sender personal account number (PAN) 602, risk score 604, validation code 606, receiving entity PAN 608, transaction ID 610, transaction details 612, and sender details 614. Sender PAN 602 includes account number information of the sending entity. In some embodiments, sender PAN 602 may be up to 19 characters in length. Payment authorization message 600 may also include risk score 604 and validation code 606, which may be the same as the risk score and validation code described above in connection with FIG. 5. Receiving entity PAN 608 and transaction ID 610 are the same as the receiving entity PAN 402 and transaction ID 410, respectively, as described above in relation to FIG. 4. Transaction details 612 may include information about the funds transfer such as amount of funds transfer, currency, exchange rate, etc. Sender details 614 are the same as the sender details 412 described in FIG. 4.

Even though payment authorization message 600 is shown as including certain information, one skilled in the art will realize that other types of information in lieu of or in addition to the information illustrated in FIG. 6 may be included in payment authorization message 600.

Upon receipt of the payment authorization message, the receiving financial institution may make an determination of whether to accept or deny the transaction. The process of conducting a funds transfer operation includes requesting an anti-money laundering screening, receiving the anti-money laundering screening response, determining whether to allow the funds transfer operation, sending payment authorization message, and determining whether to accept or deny the incoming funds transfer transaction.

Figure 7:
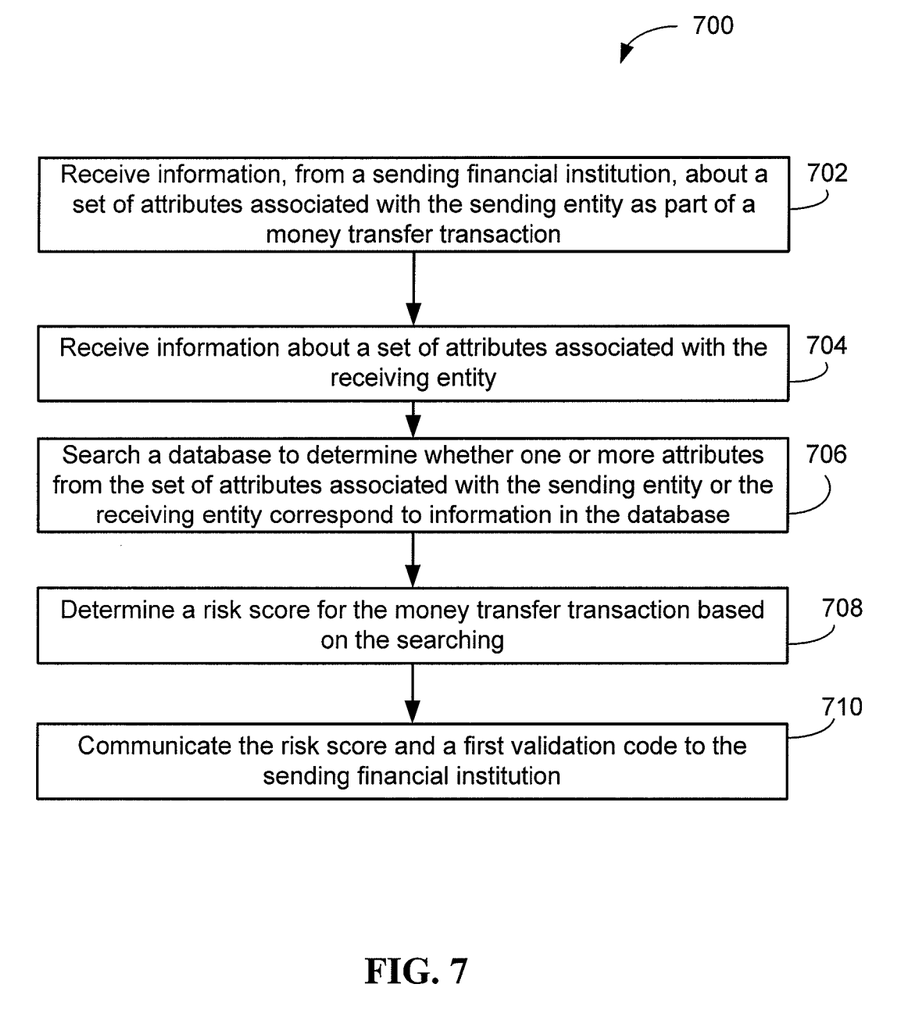
FIG. 7 is a flow diagram of a process for screening a money transfer transaction according to an embodiment of the present invention.

FIG. 7 is a flow diagram of a process 700 for conducting an anti-money laundering screening according to an embodiment of the present invention. Process 700 may be performed by e.g., anti-money laundering screening system 308 of FIG. 3.

At step 702, the anti-money laundering screening system receives information about a set of attributes associated with the sending entity. The information is received from the sending financial institution, e.g., sending financial institution 302 of FIG. 3. In some embodiments, the information about the attributes is included in the anti-money laundering screening request message describe above. In an embodiment, the set of attributes associated with the sending entity includes name, address, account number, country code, etc. In some embodiments, the anti-money laundering screening system may also receive information about a set of attributes associated with the receiving entity, at step 704. At step 706, the anti-money laundering screening system searches the anti-money laundering database to determine whether one or more of the attributes associated with the sending entity and/or the receiving entity match the information in the anti-money laundering database. Based on the results of the matching process, the anti-money laundering screening system generates a risk score at step 708. As discussed above, the risks score may be a percentage value, however, other types of values/indicators may also be used to identify the risk score. The anti-money laundering screening system then creates an anti-money laundering screening response message that includes the risk score and sends the anti-money laundering screening response message to the sending financial institution via a payment processing network at step 710.

It should be appreciated that the specific steps illustrated in FIG. 7 provides a particular method of conducting an anti-money laundering screening according to an embodiment of the present invention. Other sequences of steps may also be performed according to alternative embodiments. For example, alternative embodiments of the present invention may perform the steps outlined above in a different order. Moreover, the individual steps illustrated in FIG. 7 may include multiple sub-steps that may be performed in various sequences as appropriate to the individual step. Furthermore, additional steps may be added or removed depending on the particular applications. In particular, several steps may be omitted in some embodiments. One of ordinary skill in the art would recognize many variations, modifications, and alternatives.

Once the anti-money laundering screening is completed, the sending financial institution can decide whether to allow the transaction, deny the transaction, or hold the transaction pending more verification. In the event that the sending financial institution decides to allow the funds transfer transaction to proceed, it creates a payment authorization message and communicates the payment authorization message to the payment processing network. In some embodiments, if there is no risk score generated by the anti-money laundering screening system or no risk score is included in the anti-money laundering screening response message, the sending financial institution may deny the money transfer request and notify the sending entity accordingly. The requirement for including a risk score can be programmable based on several factors including but not limited to destination country of the money transfer, receiving entity, amount of money transfer, etc.

Figure 8:
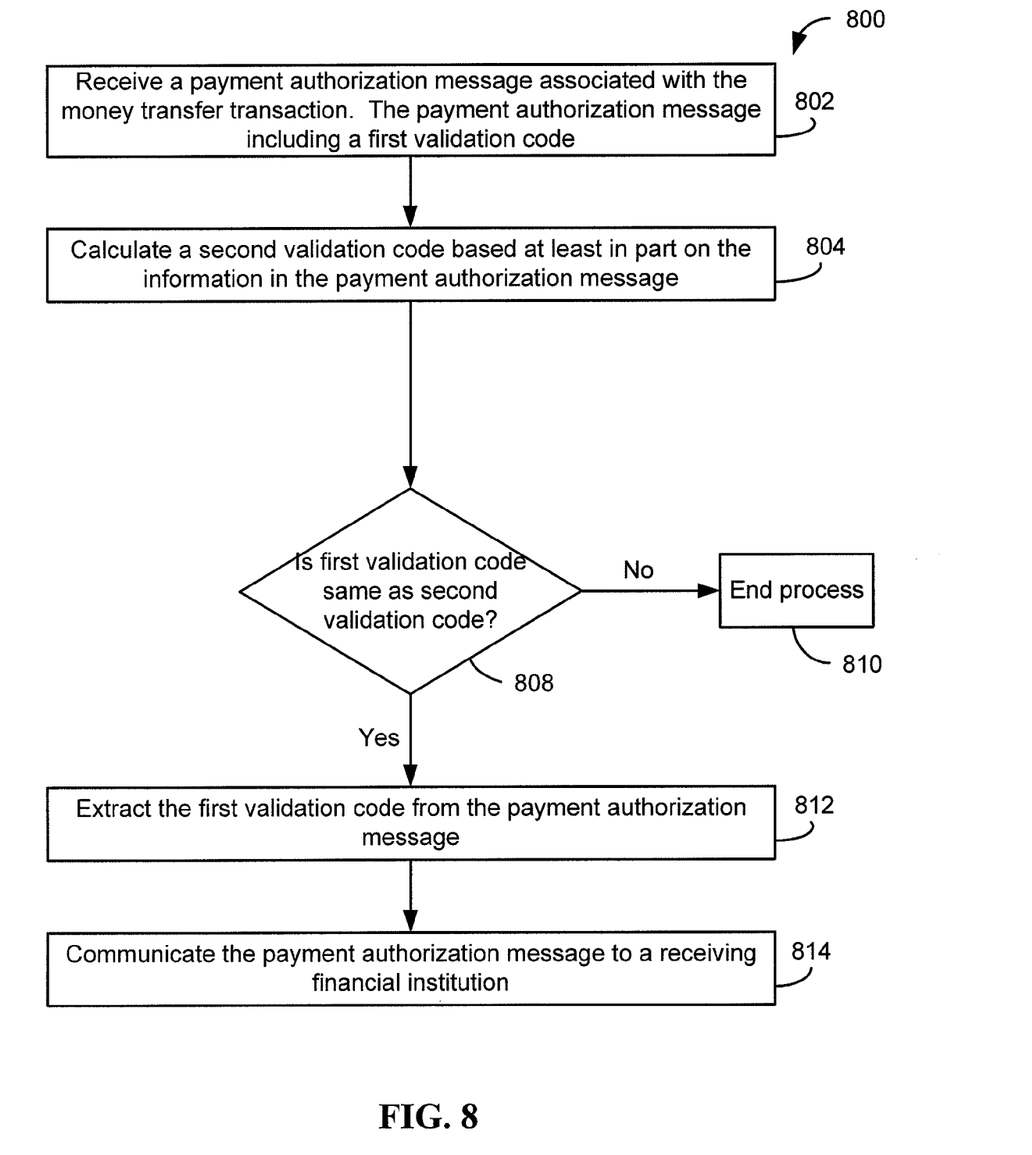
FIG. 8 is a flow diagram of a process for conducting a funds transfer operation according to an embodiment of the present invention.

FIG. 8 illustrates a flow diagram of a process 800 for conducting a funds transfer transaction according to an embodiment of the present invention. Process 800 may be performed by e.g., the payment processing network 304 of FIG. 3.

At step 802, the payment processing network receives a payment authorization message from the sending financial institution. In some embodiments, the payment authorization message includes the risk score, the first validation code, and information about the sending entity and the receiving entity. Upon receipt of the payment authorization message, the payment processing network calculates a second validation code using the information in the payment authorization message, at step 804.

The algorithm and information used for calculating the second validation code is the same as the information and algorithm used for calculating the first validation code. The algorithm to be applied and the type of information to be used for calculating the first and the second validation code is pre-defined and known only to the payment processing network. For example, if the information used to calculate the first validation code includes the sender's name, country code and account number, then the payment processing network extracts this information from the payment authorization message and applies the pre-defined algorithm to the information and determines the second validation code. The first and the second validation codes are helpful in verifying that the risk score information sent by the anti-money laundering screening system is not tampered with before being received by the receiving financial institution. Since the first validation code and the second validation code are independently generated, there is less chance that someone can tamper with the validation codes or steal the validation codes. In some embodiments, the first validation code may be determined by the anti-money laundering screening system.

At step 808, the payment processing network compares the second validation code with the first validation code included in the payment authorization message. If it is determined at step 808 that the two validation codes match, the payment processing network concludes that the risk score is not tampered with and is the original risk score that was generated by the anti-money laundering screening system. At step 812, the first validation code is extracted from the payment authorization message. The payment authorization message, which includes the risk score, is then sent to the receiving financial institution at step 814. The receiving financial institution may then decide based on the risk score whether to accept or deny the funds transfer.

If at step 808 it is determined that the second validation code is not the same as the first validation code, the process ends at step 810.

It should be appreciated that the specific steps illustrated in FIG. 8 provides a particular method of conducting an funds transfer transaction according to an embodiment of the present invention. Other sequences of steps may also be performed according to alternative embodiments. For example, alternative embodiments of the present invention may perform the steps outlined above in a different order. Moreover, the individual steps illustrated in FIG. 8 may include multiple sub-steps that may be performed in various sequences as appropriate to the individual step. Furthermore, additional steps may be added or removed depending on the particular applications. In particular, several steps may be omitted in some embodiments. One of ordinary skill in the art would recognize many variations, modifications, and alternatives.

Figure 9:
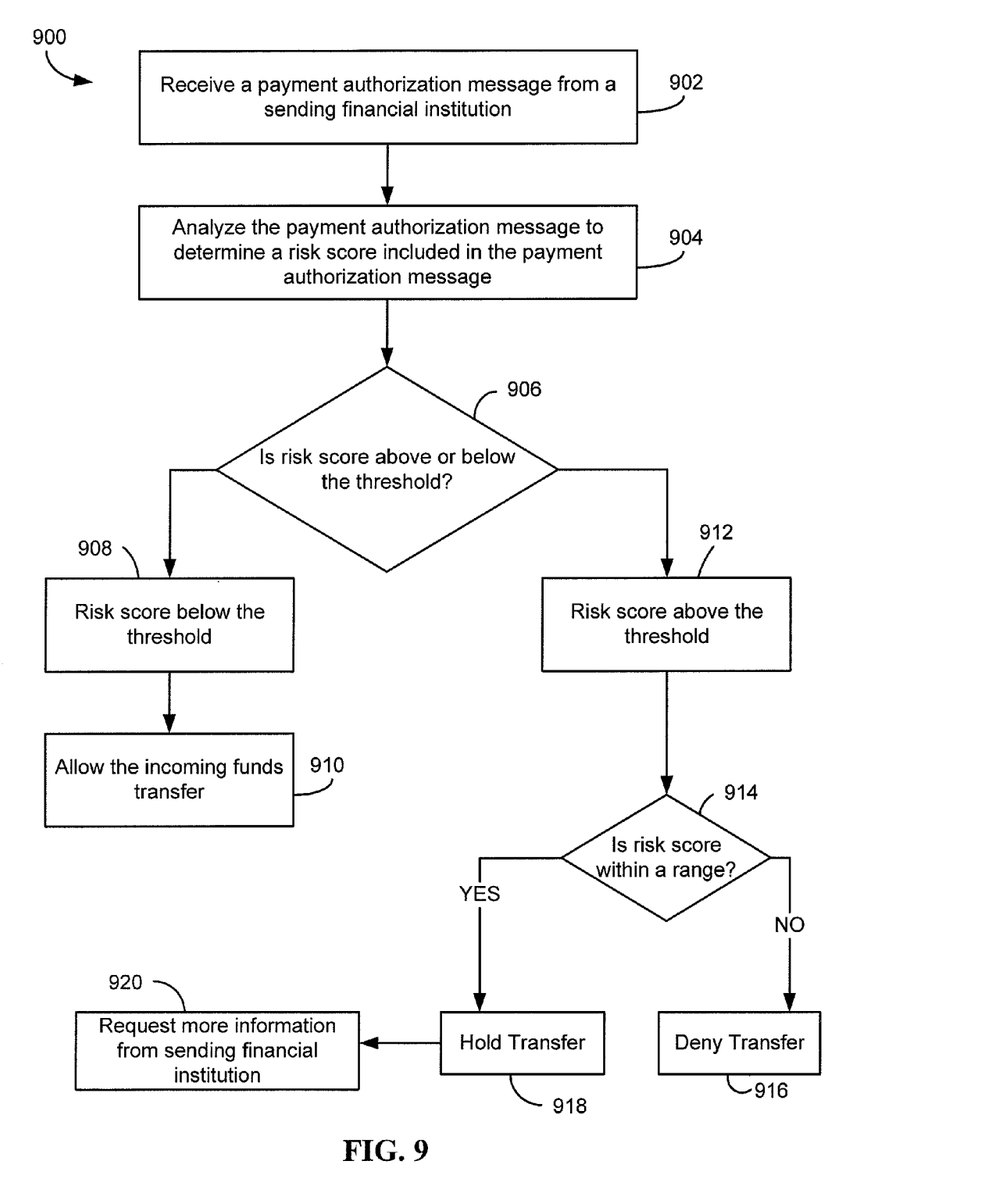
FIG. 9 is a flow diagram of a process for conducting a funds transfer operation according to another embodiment of the present invention.

Once the receiving financial institution receives the payment authorization message, it can make the determination whether to accept or deny the incoming funds transfer transaction. FIG. 9 is a flow diagram of a process 900 for conducting a funds transfer operation according to an embodiment of the present invention. Process 900 may be performed by, e.g., receiving financial institution 306 of FIG. 3.

At step 902 the receiving financial institution receives a payment authorization message from the payment processing network. The payment authorization message includes a risk score generated by the anti-money laundering screening system. After receiving the payment authorization message, the receiving financial institution analyses the message to identify the risks score included in the message at step 904.

Once identified, the risk score is compared against a threshold value specified by the receiving financial institution at step 906. For example, the receiving financial institution may specify that a funds transfer transaction with risk score of 95% or above is automatically denied, a funds transfer transaction with risk score of 75% or lower is automatically accepted, and funds transfer transaction with risk score of between 75% and 95% is put on hold pending further verification. In this example, 75% is the threshold value. One skilled in the art will realize that various other criteria for accepting or denying the incoming funds transfer may be specified by the receiving financial institution.

At step 906, if is determines that the risk score is below the threshold value (908), e.g., less than 75%, then the incoming funds transfer is allowed at step 910. If at step 906 it is determined that the risk score is above the threshold value (912), e.g., above 75%, then a further check is made to determine whether the risk score is within a certain range that would trigger a further review or above the range that would trigger a denial (914). If it is determined that the risk score is greater than the upper limit of the range, e.g., greater than 95%, the incoming funds transfer is denied at step 916. In the event that the risk score is within the range, e.g., between 75% and 95%, the receiving financial institution may hold the incoming funds transfer (918) and send a request to the sending financial institution for more information at step 920. Based on the response from the sending financial institution, the receiving financial institution may accept or deny the transaction. In some embodiments, if the incoming funds transfer is put on hold, instead of sending a request to the sending financial institution the receiving financial institution may perform additional verification on its own and then make a determination on whether to accept or deny the transaction. It is to be noted that the ranges described above are for illustrative purposes only. One skilled in the art will realize that other ranges may be specified by receiving financial institutions based on the type of funds transfer operation.

It should be appreciated that the specific steps illustrated in FIG. 9 provides a particular method of conducting an funds transfer transaction according to an embodiment of the present invention. Other sequences of steps may also be performed according to alternative embodiments. For example, alternative embodiments of the present invention may perform the steps outlined above in a different order. Moreover, the individual steps illustrated in FIG. 9 may include multiple sub-steps that may be performed in various sequences as appropriate to the individual step. Furthermore, additional steps may be added or removed depending on the particular applications. In particular, several steps may be omitted in some embodiments. One of ordinary skill in the art would recognize many variations, modifications, and alternatives.

Figure 10:
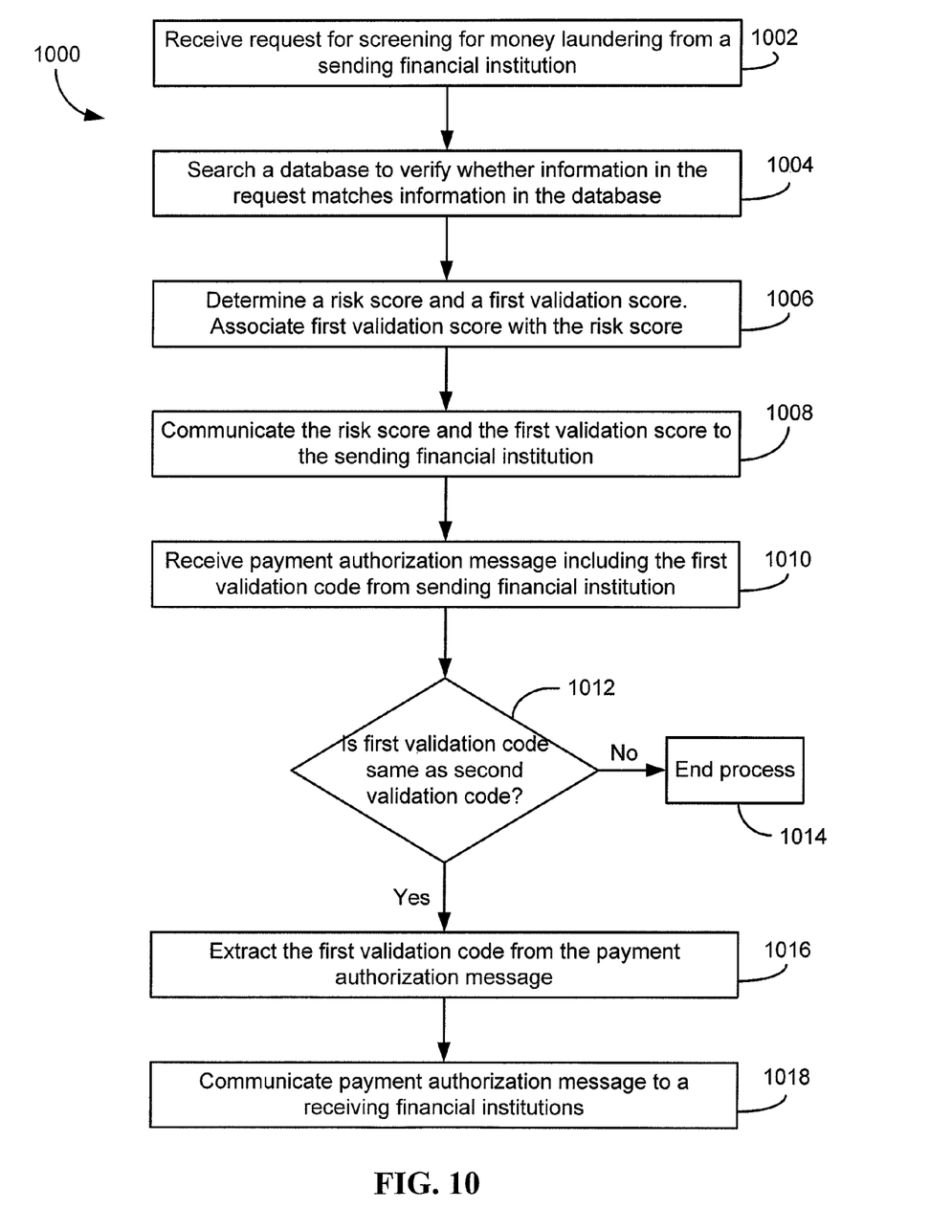
FIG. 10 is a flow diagram of a process for conducting a funds transfer operation according to another embodiment of the present invention.

FIG. 10 is a flow diagram for a process 1000 according to an embodiment of the present invention. Process 1000 can be performed, e.g., by a payment processing network 304 of FIG. 3. In this embodiment, the payment processing network also performs the anti-money laundering screening.

Process 1000 begins at step 1002 when the processing network receives a request for anti-money laundering screening request message from a sending financial institution. The screening request may include information about the sending entity and/or the receiving entity. The payment processing system then search an anti-money laundering database to verify if the information in the screening request message matches any information in the anti-money laundering database at step 1004. At step 1006, the payment processing system generates a risk score and a first validation code. The first validation code is then associated with the risk score. At step 1008, the risk score and the first validation message are communicated to the sending financial institution, e.g., via a screening response message. At step 1010, the payment processing network receives a payment authorization message if the sending financial institution determines that the money transfer is to be allowed based on the risk score. The payment authorization message includes among other things, information about the sending and receiving entity, the risk score, and the first validation score.

Upon receiving the payment authorization message, the payment processing network determines a second validation code based on information in the payment authorization message. Thereafter, the payment processing network compares the second validation code with the first validation code included in the payment authorization message at step 1012. If the two validation codes do not match, the process is terminated at step 1014.

If the two validation codes match, the payment processing network extracts the first validation code from the payment authorization message at step 1016 and communicates the payment authorization message including the risk score to the receiving financial entity at step 1018.

It should be appreciated that the specific steps illustrated in FIG. 10 provides a particular method of conducting an funds transfer transaction according to an embodiment of the present invention. Other sequences of steps may also be performed according to alternative embodiments. For example, alternative embodiments of the present invention may perform the steps outlined above in a different order. Moreover, the individual steps illustrated in FIG. 10 may include multiple sub-steps that may be performed in various sequences as appropriate to the individual step. Furthermore, additional steps may be added or removed depending on the particular applications. In particular, several steps may be omitted in some embodiments. One of ordinary skill in the art would recognize many variations, modifications, and alternatives.

Figure 11:
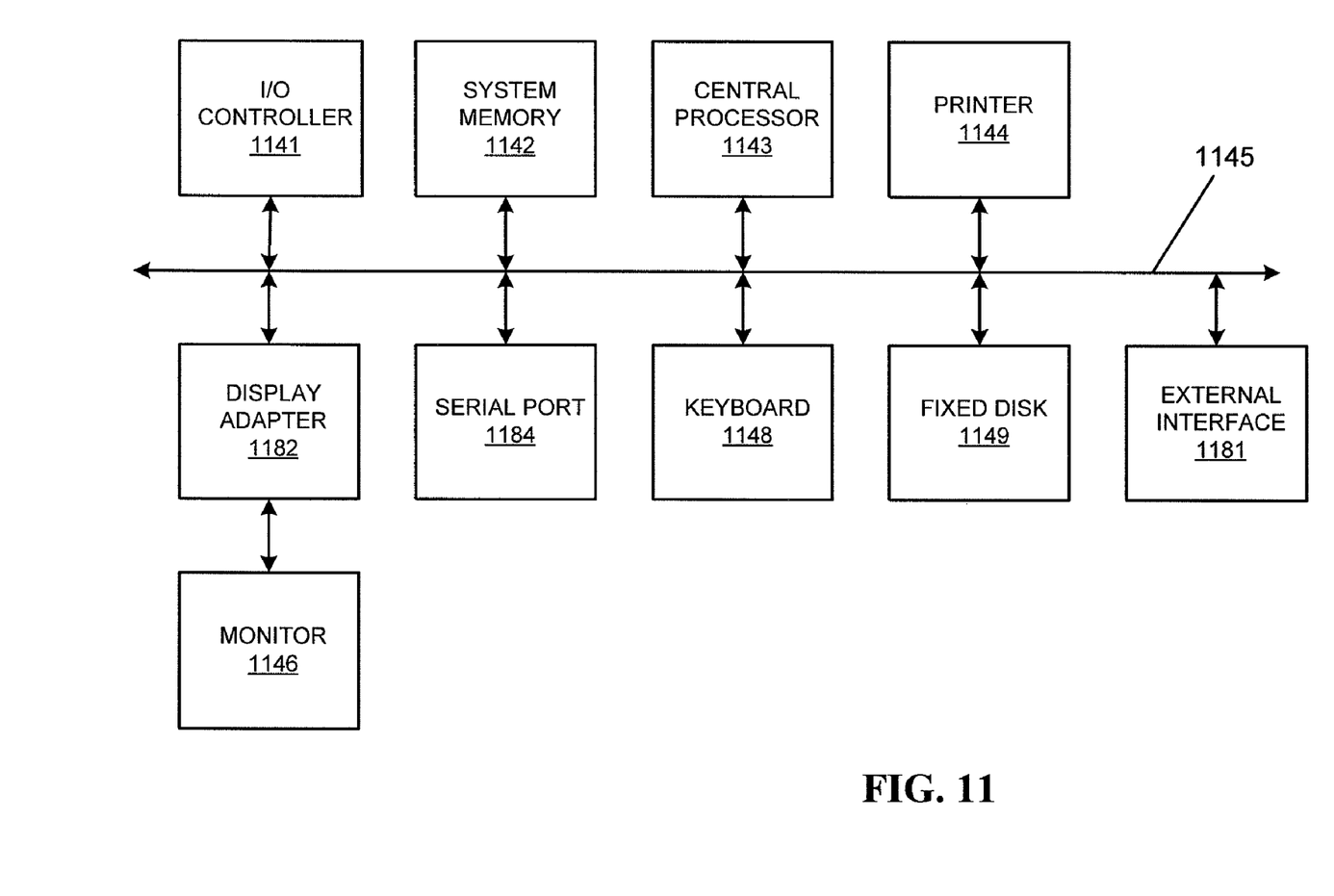
FIG. 11 is a block diagram of a computer system.

FIG. 11 is a high level block diagram of a computer system that may be used to implement any of the individual components described above in relation to FIGS. 2 and 3 and may include one or more of the subsystems or components shown in FIG. 11, which is a block diagram of a computer apparatus. The subsystems shown in FIG. 11 are interconnected via a system bus 1145. Additional subsystems such as printer 1144, keyboard 1148, fixed disk 1149, monitor 1146, which is coupled to display adapter 1182, and others are shown. Peripherals and input/output (I/O) devices, which couple to I/O controller 1141, can be connected to the computer system by any number of means known in the art, such as serial port 1184. For example, serial port 1184 or external interface 1181 can be used to connect the computer apparatus to a wide area network such as the Internet, a mouse input device, or a scanner. The interconnection via system bus 1145 allows central processor 1143 to communicate with each subsystem and to control the execution of instructions from system memory 1142 or fixed disk 1149, as well as the exchange of information between subsystems. The system memory 1142 and/or fixed disk 1149 may embody a computer readable medium.

Any of the software components or functions described in this application, may be implemented as software code to be executed by a processor using any suitable computer language such as, for example, Java, C++ or Perl using, for example, conventional or object-oriented techniques. The software code may be stored as a series of instructions, or commands on a computer readable medium, such as a random access memory (RAM), a read only memory (ROM), a magnetic medium such as a hard-drive or a floppy disk, or an optical medium such as a CD-ROM. Any such computer readable medium may reside on or within a single computational apparatus, and may be present on or within different computational apparatuses within a system or network.

The above description is illustrative and is not restrictive. Many variations of the invention will become apparent to those skilled in the art upon review of the disclosure. The scope of the invention should, therefore, be determined not with reference to the above description, but instead should be determined with reference to the pending claims along with their full scope or equivalents.

One or more features from any embodiment may be combined with one or more features of any other embodiment without departing from the scope of the invention.

A recitation of "a", "an" or "the" is intended to mean "one or more" unless specifically indicated to the contrary.

It should be understood that the present invention as described above can be implemented in the form of control logic using computer software in a modular or integrated manner. Based on the disclosure and teachings provided herein, a person of ordinary skill in the art will know and appreciate other ways and/or methods to implement the present invention using hardware and a combination of hardware and software.

What is claimed is:

1. A computer-implemented method comprising:
receiving, by a payment processing network server, from a sending financial institution, information about a first set of attributes associated with a sending entity and a second set of attributes associated with a receiving entity for a money transfer transaction;
searching, by the payment processing network server, a database to determine whether one or more attributes from the first set of attributes or the second set of attributes correspond to information in the database;
determining, by the payment processing network server, a risk score for the money transfer transaction based on the searching;
communicating, by the payment processing network server, the risk score to the sending financial institution;
receiving, by the payment processing network server, from the sending financial institution, a payment authorization message associated with the money transfer transaction, the payment authorization message including the risk score;
communicating, by the payment processing network server, the payment authorization message including the risk score to a receiving financial institution; and receiving a response message from the receiving financial institution indicating whether the money transfer was accepted or denied, wherein the receiving financial institution generates the response based at least in part on the risk score.

2. The method of claim 1 further comprising:
determining, by the payment processing network server, a first validation code and associating the first validation code with the risk score;
communicating, by the payment processing network server, the validation code to the sending financial institution;
receiving, by the payment processing network server, the first validation code as part of the payment authorization message;
calculating, by the payment processing network server, a second validation code based at least in part on the information in the payment authorization message but excluding the first validation code;
determining, by the payment processing network server, that the second validation code is the same as the first validation code; and
extracting, by the payment processing network server, the first validation code from the payment authorization message and sending the payment authorization message to the receiving financial institution.

3. The method of claim 2 wherein determining the first validation code further comprises applying a validation algorithm to a fixed set of attributes.

4. The method of claim 3 wherein the fixed set of attributes comprises name of the sending entity, country code of the sending entity, the risk score, account number of the receiving entity, and a transaction ID associated with the money transfer.

5. The method of claim 1 wherein the set of attributes of the sending entity comprises name, address, identification number, and country of residence.

6. The method of claim 1 wherein the database includes information received from one or more of Office of Foreign Assets Control (OFAC), US department of Commerce, the White House, US regulatory actions, and information provided by government and non-government entities outside the United States.

7. The method of claim 1 wherein the risk score is indicative of a percentage match between the one or more attributes of the sending entity or the receiving entity and information in the database.

8. The method of claim 1 wherein each attribute from the set of attributes is weighted differently from each other and the method further comprises determining an individual risk score for each of the attributes from the set of attributes.

9. The method of claim 8 wherein determining the risk score comprises determining a combined risk score based on the weight assigned to each attribute and the individual risk score of each attribute.

10. A computer server comprising:
a processor;
a memory coupled with the processor, wherein the memory includes a database;
an analysis module coupled with the processor; and
a network interface module coupled with the memory and the processor, the network interface module configured to communicate with one or more external systems, wherein the processor is configured to:
receive, from a sending financial institution, information about a set of attributes associated with a sending entity and information about a set of attributes associated with a receiving entity;
query the database to determine whether one or more attributes from the set of attributes associated with the sending entity or the receiving entity correspond to information in the database;
calculate a risk score for a money transfer transaction between the sending entity and the receiving entity based on the determination;
determine a first validation code for the money transfer transaction;
associate the first validation code with the risk score;
communicate the risk score and the first validation code to the sending financial institution;
receive, from the sending financial institution, a payment authorization message associated with the money transfer transaction, the payment authorization message including the risk score and the first validation code;
communicate, using the network interface module, the payment authorization message including the risk score to a receiving financial institution; and
receive a response message from the receiving financial institution indicating whether the money transfer was accepted or denied, wherein the receiving financial institution generates the response based at least in part on the risk score.

11. The computer server of claim 10 wherein the analysis module includes a rules engine that stores a first set of criteria received from the sending financial institution and a second set of criteria received from the receiving financial institution, wherein the first set of criteria or the second set of criteria are used in determining the risk score.

12. The computer server of claim 10 wherein the set of attributes of the sending entity comprises at least one of a name, an identification number, and country of residence.

13. The computer server of claim 10 wherein the database comprises information received from one or more external sources, the one or more external sources including:
Office of Foreign Assets Control (OFAC);
U.S. Commerce Department;
U.S. White House;
U.S. regulatory actions;
a foreign government;
U.S. state regulatory enforcement actions;
international regulatory enforcement actions;
a list of politically connected individuals and military leaders;
a list of U.S. and international organized crime members and affiliates;
financial Action Task Force (FATF);
a list of recognized high risk countries; and
court records.

14. The computer server of claim 10 wherein the risk score is indicative of a percentage match between the information received from the sending financial institution and information in the database.

15. The computer server of claim 14 wherein the risk score ranges between 0% and 100%.

16. The computer server of claim 10 wherein the processor is further configured to:
calculate a second validation code based on information in the payment authorization message other than the first validation code;

determine that the first validation code is same as the second validation code; and extract the first validation code from the payment authorization message prior to sending the payment authorization message to the receiving financial institution.

17. A computer-readable non-transitory storage medium storing instructions that when executed by a processor in a computer system cause the processor to perform a method comprising:

receiving from a sending financial institution, information about a first set of attributes associated with a sending entity and a second set of attributes associated with a receiving entity for a money transfer transaction;

searching a database to determine whether one or more attributes from the first set of attributes or the second set of attributes correspond to information in the database;

determining a risk score for the money transfer transaction based on the searching;

communicating the risk score to the sending financial institution;

receiving from the sending financial institution, a payment authorization message associated with the money transfer transaction, the payment authorization message including the risk score;

communicating the payment authorization message including the risk score to a receiving financial institution; and receiving a response message from the receiving financial institution indicating whether the money transfer was accepted or denied, wherein the receiving financial institution generates the response based at least in part on the risk score.

* * * * *